US012514947B2

(12) United States Patent
Guggenheim

(10) Patent No.: US 12,514,947 B2
(45) Date of Patent: Jan. 6, 2026

(54) SCENTING DEVICE FOR A VEHICLE

(71) Applicant: Supair-Tel AG, Glattbrugg (CH)

(72) Inventor: Rudolf Heinrich Guggenheim, Wollerau (CH)

(73) Assignee: Supair-Tel AG, Glattbrugg (CH)

( * ) Notice: Subject to any disclaimer, the term of this patent is extended or adjusted under 35 U.S.C. 154(b) by 703 days.

(21) Appl. No.: 17/900,401

(22) Filed: Aug. 31, 2022

(65) Prior Publication Data

US 2023/0073998 A1 Mar. 9, 2023

(30) Foreign Application Priority Data

Sep. 1, 2021 (EP) ..................................... 21194257

(51) Int. Cl.
*A61L 9/012* (2006.01)
(52) U.S. Cl.
CPC ........... *A61L 9/012* (2013.01); *A61L 2209/15* (2013.01)
(58) Field of Classification Search
CPC ...................................................... A61L 9/012
See application file for complete search history.

(56) References Cited

U.S. PATENT DOCUMENTS

| 8,485,454 | B1 * | 7/2013 | Irvin ....................... A61L 9/125 239/34 |
| 9,743,737 | B1 * | 8/2017 | Malbrough ............ A45D 20/10 |
| 11,059,353 | B1 | 7/2021 | Bennett et al. |
| 2020/0331326 | A1 | 10/2020 | Bourne |

OTHER PUBLICATIONS

Extended European Search Report from corresponding European Patent Application No. 21 194 257.8, Feb. 17, 2022.

* cited by examiner

*Primary Examiner* — Donald R Spamer
(74) *Attorney, Agent, or Firm* — Workman Nydegger

(57) ABSTRACT

A scenting device is provided for scenting an interior of a vehicle. The scenting device comprises a housing and a scent container arranged in the housing. In addition, the scenting device comprises a holding device for attaching the scenting device to a ventilation in the interior of the vehicle. The holding device has a holding element with an opening and the opening is designed in the form of a through hole or a blind hole. Protrusions are arranged on the edge or on the walls of the opening, wherein the protrusions extend along the depth to different extents into the interior of the opening.

20 Claims, 2 Drawing Sheets

SCENTING DEVICE FOR A VEHICLE

FIELD OF THE INVENTION

The invention relates to a scenting device for a vehicle with a housing and a scent container arranged in the housing. Furthermore, the scenting device comprises a holding device for attaching the scenting device to a ventilation in the interior of a vehicle. The holding device comprises a holding element with an opening. The opening has a depth and is in the form of a through hole or a blind hole.

BACKGROUND

Scenting devices are known which can be suspended in the interior of a vehicle and have, for example, a material impregnated with a scent. Such devices can be manufactured at low cost, but their scenting effect can be uneven and the scenting body, which is usually suspended from the interior rear-view mirror, can disturb visibility.

Furthermore, containers with scent are known which are attached to a ventilation grille in the interior of a vehicle. The container for the scent has inlet openings so that air from the ventilation flows into the container, comes into contact with the scent and, enriched with scent molecules, leaves the container through outlet openings. Such containers can be attached to and removed from the ventilation grille by means of a clamping part.

SUMMARY

The object is to provide a scenting device which can be reliably mounted on a ventilation of a vehicle.

This object is solved by a scenting device for a vehicle with the features of claim 1. The term "vehicle" includes land vehicles, such as passenger cars and trucks, and also aircrafts.

The scenting device according to the invention comprises a housing in which a scent container is arranged. Furthermore, the scenting device comprises a holding device for attaching the scenting device to a ventilation in the interior of the vehicle. The holding device comprises a holding element which has an opening or a hole. The opening has a depth and is in the form of a through hole or a blind hole.

If the opening is in the form of a through hole, the opening is continuous through the holding element, i.e. the depth of the opening corresponds to the thickness of the holding element. If the opening is a blind hole, the opening is not continuous and the opening is only accessible on one side.

Protrusions are arranged on the edge or on the walls of the opening. These protrusions extend from the edge into the interior of the opening. Along the depth, however, the protrusions extend to different extents into the interior of the opening, in particular the protrusions taper in the direction of depth.

Protrusions which extend differently far into the interior of the opening along the depth have the advantage that objects of different sizes can be optimally clamped between the protrusions. The scenting device can thus be reliably clamped onto objects of different sizes.

The holding element may in particular comprise as material silicone, rubber and/or an elastomer, in particular a thermoplastic elastomer. In particular, it may comprise a material having a hardness in the range of 30 Shore-A to 90 Shore-A.

Advantageously, the through hole or the blind hole is shaped in the form of a cylinder, in particular in the form of a circular cylinder or in the form of a cylinder with an elliptical base. The cylindrical shape comprises a shell surface and a height. The height of the cylindrical shape corresponds to the depth of the opening. The protrusions are located on the shell surface and extend along the height to varying degrees into the interior of the cylindrical opening.

Cylindrical shapes with a circle or an ellipse as the base surface allow round or cylindrical elements, in particular buttons, to be clamped in the holding device. The scenting device can thus be placed on buttons attached to the ventilation.

In particular, the protrusions are hollow. A hollow interior results in a higher elasticity of the protrusions. The protrusions can thus adapt more easily and flexibly to the shape of elements to be clamped. In particular, the hollow space is shaped in the form of a blind hole and not in the form of a through hole.

Advantageously, the individual protrusions are spaced apart from each other, i.e. the individual protrusions do not touch each other, in particular not at the edge of the opening. The distance is in particular greater than one third of the width of the protrusions. An intermediate space between the protrusions has the advantage that the protrusions can also deform elastically into this intermediate space. As a result, the protrusions can better adapt to the shape of the elements to be clamped and the scenting device adheres more reliably.

Advantageously, the opening has a depth or height of at least 5 mm, in particular at least 7.5 mm. Such sizes ensure a sufficiently large area within the opening with which the scenting device can adhere to the ventilation.

In particular, the protrusions extend along the depth for at least 50%, especially at least 75%.

In a particular embodiment, the holding device comprises a groove surrounding the opening. In particular, the groove is circular and is particularly suitable for securing the holding device to the housing. With the groove provided, the holding device can be clamped onto the housing in a simple manner.

In particular, the scenting device comprises a sliding device with which inlet and/or outlet openings of the housing can be at least partially closed by means of a sliding movement.

Advantageously, the sliding device has at least two handles, by the actuation of which the sliding device is slidable, in particular wherein the actuation is effected by pressing the handles into the housing. The handles may be configured such that actuation of one of the at least two handles opens the inlet and/or outlet openings and actuation of another of the at least two handles closes the inlet and/or outlet openings.

In particular, the sliding device has a locking device such that, in the locked position, the handles cannot be actuated and the sliding movement cannot be performed. This is to prevent unintentional manipulation of the scenting device.

In a particular embodiment, the scent container surrounds the holding element and/or the scent container has an opening, in particular a continuous opening, within which the holding element is arranged. In particular, the scenting device is adapted to receive exactly one scent container in the housing.

Advantageously, the scenting device has a non-continuous recess which is suitable for a control knob of the ventilation to engage in the recess when the scenting device is attached to the ventilation. In particular, the protrusions protrude into the recess of the scenting device so that the control knob can be clamped inside the recess by means of the protrusions. The scenting device thereby adheres to the control knob and can be impinged upon by the ventilation.

The invention also relates to a car comprising a ventilation with a control knob and a scenting device according to the invention. The scenting device is arranged on the control knob, in particular with the holding element, in particular the protrusions, clamping the control knob. In particular, the scenting device can be removed from the control knob.

The arrangement of the scenting device on the control knob has the advantage that it can be stably mounted directly in front of the ventilation. The scenting device is exposed to air flow and the air escapes from the scenting device with scent molecules.

BRIEF DESCRIPTION OF THE DRAWINGS

Further embodiments, advantages and applications of the invention will be apparent from the dependent claims and from the following description based on the figures. The figures show:

DETAILED DESCRIPTION OF THE INVENTION

Figure 1:
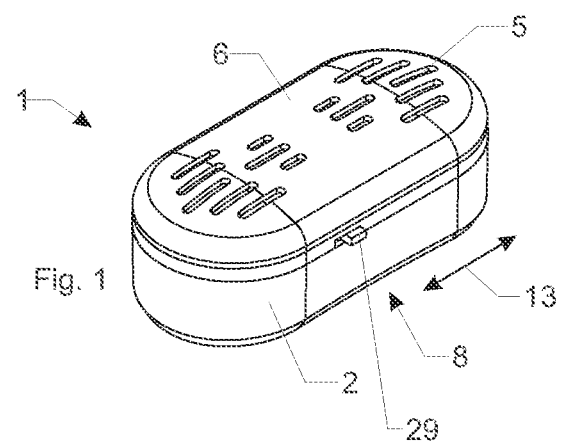
FIG. 1 shows a scenting device according to the invention.

FIGS. 1 to 4 show a scenting device 1 according to the invention for a vehicle with a housing 2 and a scent container 3 arranged in the housing 2. The scent container 3 is replaceable. The scent container 3 can be removed from the housing 2 and a new scent container 3 can be inserted into the housing 2. The scenting device 1 has a holding device with a holding element 4. By means of the holding device, the scenting device 1 can be mounted on a ventilation system in the interior of the vehicle.

The scenting device 1 comprises outlet openings 5, which are arranged on an outlet side 6. In addition, the scenting device 1 comprises inlet openings 7, which are arranged on an inlet side 8. The inlet side 8 is arranged opposite the outlet side 6.

If the scenting device 1 is mounted on the ventilation in the passenger compartment of the vehicle, the inlet side 8 is directed towards the ventilation and the outlet side 6 is directed away from the ventilation. Air flows out of the ventilation through the inlet openings 7, into the housing 2 and into the scent container 3 arranged in the housing 2. The air comes into contact with the scent in the scent container 3, is enriched with scent molecules and leaves the housing 2 of the scenting device 1 through the outlet openings 5. The air reaches the interior of the vehicle and scents the interior.

Scent Container

Figure 2:
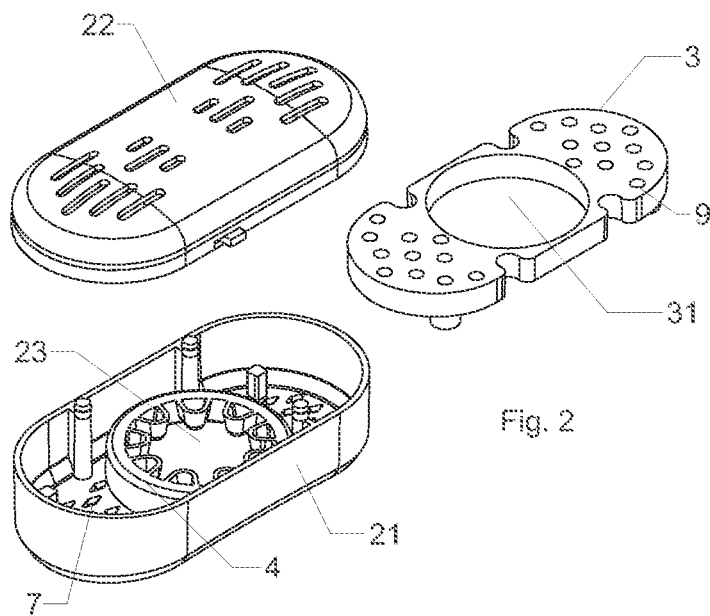
FIG. 2 shows the scenting device when the scent container is replaced.

The scent container 3, as shown in FIG. 2, is replaceable, wherein the material of the scent container 3 comprises or consists of a composite material of at least one polymer, in particular an elastomer, and the scent. In this case, the polymer is enriched with the scent and acts as its carrier. The scent stick preferably has a plurality of passage openings 9 through which the air emerging from the ventilation slot can flow. By providing the passage openings 9, the surface area is increased at which the air emerging from the ventilation slot comes into contact with the scent, which results in an increased enrichment of the air flowing through the scenting device 1 with scent molecules. The passage openings 9 are preferably aligned with the direction of flow of the air from the ventilation slot. Alternatively, the scent may be provided in the form of granules contained in a cage.

As shown in FIG. 2, the housing 2 comprises a housing shell 21 and a housing cover 22. To replace the scent container 3, the user opens the housing cover 22, replaces the scent container 3 and locks the scent container 3 into the housing 2 by closing the housing cover 22.

Structure of the Scenting Device

Figure 3:
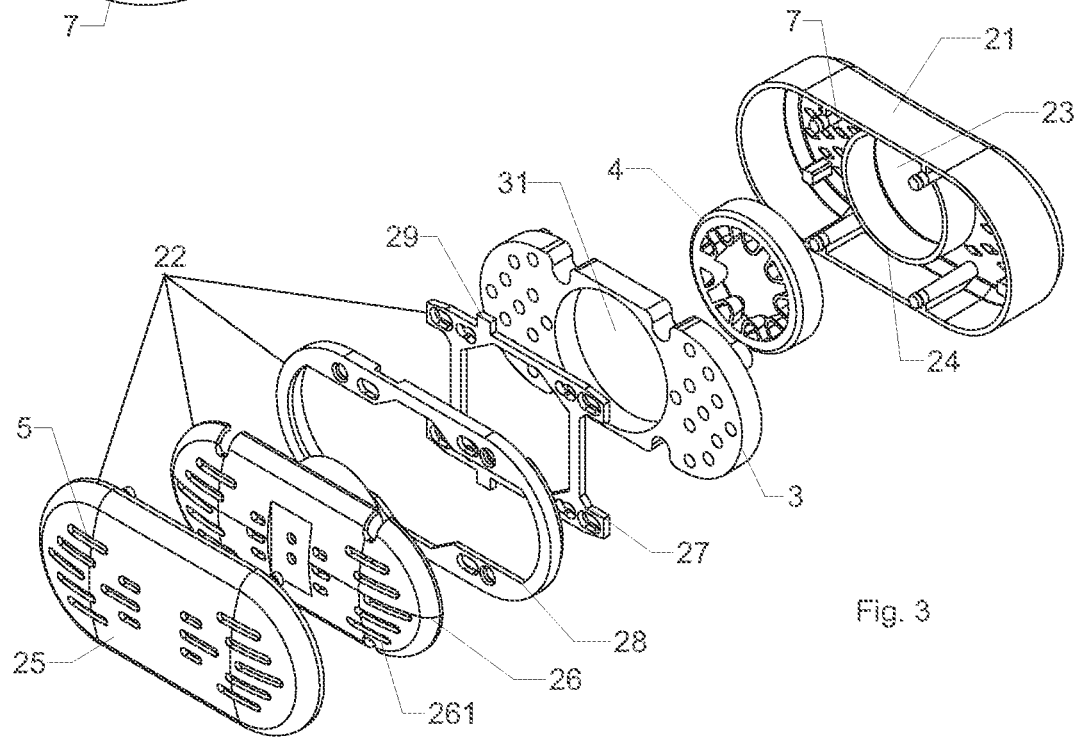
FIG. 3 an exploded view of the scenting device.

FIG. 3 shows an exploded view of the scenting device 1. As mentioned, the scenting device 1 comprises a housing shell 21. The inlet openings 7 are arranged at the bottom of the housing shell 21. A larger housing opening 23 is provided in the centre, which is surrounded by a circular web 24. The aforementioned holding element 4 can be clamped onto the circular web 24, whereby the holding element 4 also has an opening 41 in the centre. The holding element 4 comprises a groove on the bottom side along its entire circumference, which is not visible in FIG. 3. When the holding element 4 is clamped onto the circular web 24 of the housing shell 21, the circular web 24 engages in the groove of the holding element 4.

There is space between the holding element 4 and the side walls of the casing 21 into which the scent container 3 can be inserted. The scent container 3 has a larger circular opening 31 in the centre. When the scent container 3 is inserted in the housing 2, the circular opening 31 of the scent container 3 surrounds the holding element 4. In other words, the holding element 4 is arranged inside the circular opening 31 of the scent container 3.

The other individual parts shown in FIG. 3 are part of the housing cover 22. The housing cover 22 comprises a cover 25, a sliding device 26, a handle element 27 and a ring 28. The cover 25 and the ring 28 are permanently connected to each other. The sliding device 26 and the handle element 27 are also fixed to each other. During a sliding movement, the sliding device 26 and the handle element 27 move relative to the cover 25 and the ring 28.

The outlet openings 5 are arranged on the cover 25. These can be opened and closed by means of the sliding device 26. To open and close the outlet openings 5, the user pushes one of the handles 29 arranged on the handle element 27 into the housing cover 22. The handle element 27, which is permanently connected to the sliding device 26, thereby moves the sliding device 26 relative to the cover 25.

Figures 4A, 4B:
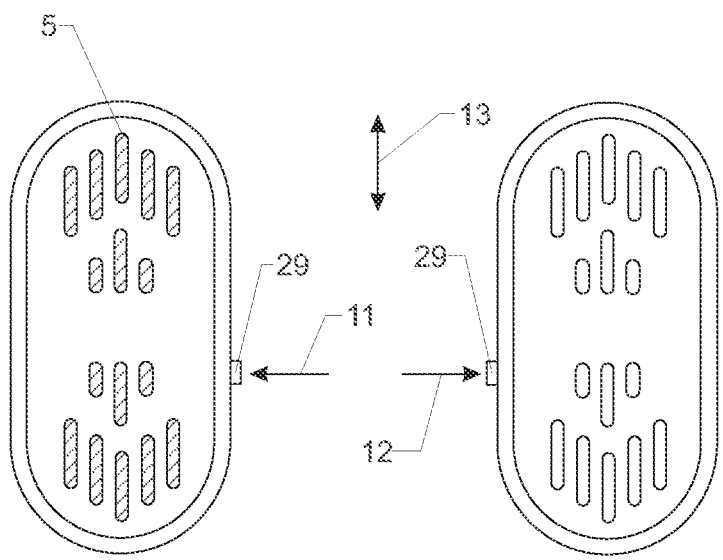
FIG. 4a the scenting device with view from above and closed outlet openings.
FIG. 4b the scenting device as seen from above with the outlet openings open.

FIG. 4 illustrates the possible sliding movements. Arrow 11 points to the handle 29 which the user must press in the direction of arrow 11 to open the outlet openings 5. Arrow 12 points to the handle 29 which the user must press in the direction of arrow 12 to close the outlet openings 5.

In the closed state, the struts of the sliding device 26 cover the outlet openings 5. Air cannot flow through the scenting device 1. In the open state, the outlet openings 5 of the cover 25 are congruent with the passage openings 261 of the sliding device 26. Air can flow through the scenting device 1 and be enriched with scent molecules of the scent container 3.

The sliding device 26 is equipped with a locking device. If the sliding device 26 is locked, the outlet openings 5 cannot be closed or opened. The sliding device 26 is blocked and cannot be moved. The locking is done by latching the handle element 27 at the housing 2. By moving one of the handles 29 in the direction of the double arrow 13, the user can lock the sliding device 26 or release the locking.

Figure 5:
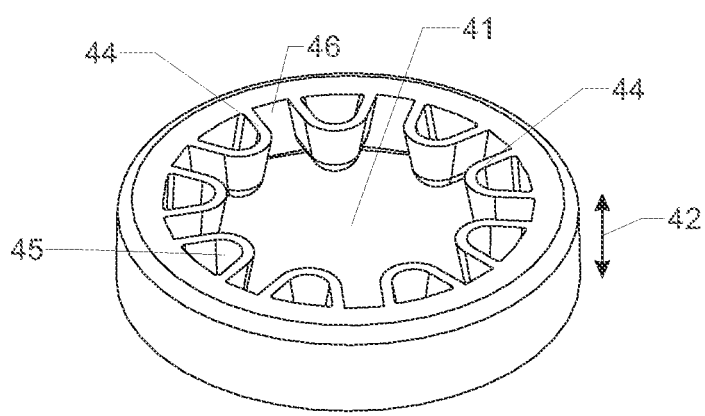
FIG. 5 the holding element of the scenting device.
Figure 6:
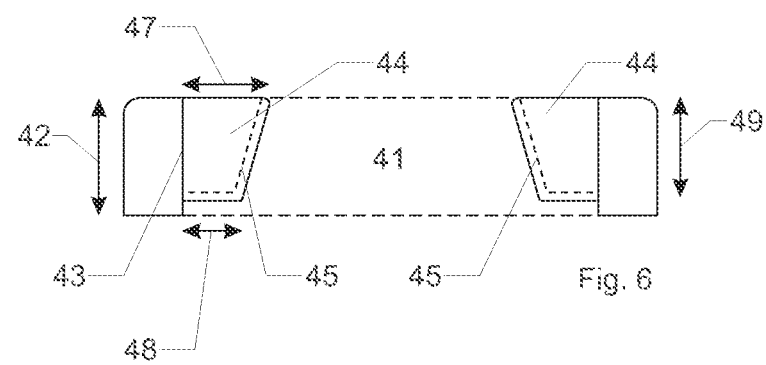
FIG. 6 a highly simplified sectional view through the holding element of FIG. 5.

FIGS. 5 and 6 show a detailed view of the holding element 4. The holding element 4 is circular in shape and includes a centrally located opening 41. The thickness of the holding element 4 is referred to as the depth 42.

The centrally arranged opening 41 extends over the entire depth 42, is accordingly continuous and is therefore referred to as an opening in the form of a through hole. The depth 42 is approximately 8 mm. If the opening 41 were not continuous, but closed from one side, it would not be described as a through hole, but as a blind hole. Such a design would also be possible.

Due to the circular opening 41, the through hole has the shape of a circular cylinder. A circular cylinder is defined by its base area and its shell surface. The base area corresponds to the opening area of the opening 41. The shell area corresponds to the walls 43 of the opening 41. The walls 43 surround the opening 41 and correspond to the inner side walls of the holding element 4.

Starting from the walls 43 or the lateral surface, protrusions 44 extend into the interior of the opening 41. There are a total of nine protrusions 44, which are arranged equidistantly to each other along the shell surface. The protrusions 44 are hollow, whereby the hollow space 45 is not continuous but in the form of a blind hole. Due to the hollow space 45, the protrusions can be deformed elastically very well. In FIG. 6 the cavity 45 is illustrated by dashed lines.

Furthermore, there is a space 46 between adjacent protrusions 44, i.e. adjacent protrusions 44 are spaced apart. Due to the spaces 46, the protrusions 44 can also deform elastically well.

FIG. 6 shows a sectional view across the diameter of the holding element 4. For simplification, only those two protrusions 44 are drawn which lie in the sectional area. Starting from the edge 43 or the shell surface of the holding element 4, the protrusions 44 protrude into the interior of the opening 41. The protrusions 44 are shaped such that they extend along the depth 42 to different extents into the interior of the opening 41. For example, the protrusions 44 shown in FIG. 6 extend at their upper sides from the edge 43 over a width 47 into the interior of the opening 41. At their lower sides, however, the protrusions 44 extend only over a width 48. Thus, the protrusions 44 extend over different widths along the depth 42 into the interior of the opening 41.

In the present embodiment, the protrusions 44 are shaped such that they extend continuously less far into the interior of the opening 41, starting from the upper side towards the lower side of the holding element 4. The extension width is continuously reduced. In other words, the protrusions 44 taper along the depth 41.

Along the depth 41, the protrusions 44 extend over a length 49. The length 49 corresponds to about 85% of the total depth 41 of the holding element 4.

Application of the Scenting Device

Viewed as a whole, the scenting device 1 has a recess which is used for mounting the scenting device 1 on a ventilation system in a vehicle. In the present embodiment, this recess consists essentially of the housing opening 23 and the opening 41 of the holding element 4.

Certain ventilations have round-shaped control knobs with which the user can regulate the ventilation intensity. If the user wants to mount the scenting device 1 on the ventilation, he puts the scenting device over such a control knob. The control knob engages the recess of the scenting device 1, and the scenting device 1 clamps to the control knob by means of the protrusions 44 of the holding element 4.

While preferred embodiments of the invention are described in the present application, it should be clearly noted that the invention is not limited thereto and may also be carried out in other ways within the scope of the following claims.

The invention claimed is:

1. A scenting device for a vehicle, the scenting device comprising:
   a housing,
   a scent container arranged in the housing, and
   a holding device for attaching the scenting device to a ventilation in the interior of the vehicle,
   wherein the holding device comprises a holding element with an opening and the opening being designed in the form of a through hole or a blind hole and having a depth,
   wherein protrusions are arranged on the edge or on the walls of the opening, wherein the protrusions extend into the interior of the opening to different extents along the depth, and
   wherein the protrusions are hollow.

2. The scenting device according to claim 1, wherein the through hole or the blind hole has the shape of a cylinder with a shell surface and a height, wherein the protrusions are arranged on the shell surface and extend along the height to different extents into the interior of the cylinder.

3. The scenting device according to claim 1, wherein the individual protrusions are spaced apart from one another, a distance, wherein the distance is greater than one third of the width of the protrusion.

4. The scenting device according to claim 1, wherein the opening has a depth of at least 5 mm.

5. The scenting device according to claim 1, wherein the protrusions extend along the depth over at least 50% of the depth.

6. The scenting device according to claim 1, wherein the holding device comprises a groove surrounding the opening.

7. The scenting device according to claim 1, comprising a slider with which inlet openings and/or outlet openings of the housing can be at least partially closed by means of a sliding movement.

8. The scenting device according to claim 1, wherein the scent container, surrounds the holding element.

9. The scenting device according to claim 1, comprising a recess, suitable that when the scenting device is attached to the ventilation, a control knob of the ventilation can engage in the recess.

10. The scenting device according to claim 9, wherein the protrusions protrude into the recess of the scenting device, adapted to clamp the control knob.

11. The scenting device according to claim 1, wherein the protrusions extend into the interior of the opening to different extents tapering along the depth.

12. The scenting device according to claim 1, wherein the protrusions are hollow with a cavity which is in the form of a blind hole and not in the form of a through hole.

13. The scenting device according to claim 1, wherein the groove is a circular groove surrounding the opening and is suitable for fastening the holding device to the housing.

14. The scenting device according to claim 1, wherein the through hole or the blind hole has the shape of a circular cylinder or a cylinder with an elliptical base.

15. The scenting device according to claim 1, wherein the scent container has an opening within which the holding element is arranged.

16. A scenting device for a vehicle, the scenting device comprising:
   a housing,
   a scent container arranged in the housing, and
   a holding device for attaching the scenting device to a ventilation in the interior of the vehicle,
   wherein the holding device comprises a holding element with an opening and the opening being designed in the form of a through hole or a blind hole and having a depth,
   wherein protrusions are arranged on the edge or on the walls of the opening, wherein the protrusions extend into the interior of the opening to different extents along the depth,
   wherein the scenting device further comprises a slider with which inlet openings and/or outlet openings of the housing can be at least partially closed by means of a sliding movement, and
   wherein the slider has at least two handles, by the actuation of which the slider is slidable.

17. The scenting device according to claim 16, wherein the slider has a lock such that, in the locked position, the handles cannot be actuated and the sliding movement cannot be carried out.

18. A car comprising:
   a ventilation with a control knob; and
   a scenting device for a vehicle, the scenting device including
      a housing,
      a scent container arranged in the housing, and
      a holding device for attaching the scenting device to a ventilation in the interior of the vehicle,
      wherein the holding device comprises a holding element with an opening and the opening being designed in the form of a through hole or a blind hole and having a depth,
      wherein protrusions are arranged on the edge or on the walls of the opening, wherein the protrusions extend into the interior of the opening to different extents along the depth,
      wherein the scenting device is arranged on the control knob.

19. The car according to claim 18, wherein the scenting device is removable from the control knob.

20. The car according to claim 18, wherein the holding element clamps the control knob.

* * * * *